United States Patent [19]

Lofgren

[11] Patent Number: 4,780,817
[45] Date of Patent: Oct. 25, 1988

[54] METHOD AND APPARATUS FOR PROVIDING DESTINATION AND VEHICLE FUNCTION INFORMATION TO AN AUTOMATIC GUIDED VEHICLE

[75] Inventor: Gunnar K. Lofgren, Charlotte, N.C.

[73] Assignee: NDC Technologies, Inc., Charlotte, N.C.

[21] Appl. No.: 909,611

[22] Filed: Sep. 19, 1986

[51] Int. Cl.$^4$ .............................................. G06F 15/50
[52] U.S. Cl. ............................. 364/424.01; 180/168; 318/587
[58] Field of Search ............... 364/424; 318/587; 180/167, 168, 169; 365/192

[56] References Cited

U.S. PATENT DOCUMENTS

| | | | |
|---|---|---|---|
| 4,049,961 | 9/1977 | Marcy | 180/169 |
| 4,168,760 | 9/1979 | Paul, Jr. et al. | 318/587 |
| 4,278,142 | 7/1981 | Kono | 364/424 |
| 4,361,202 | 11/1982 | Minovitch | 180/168 |
| 4,379,497 | 4/1983 | Hainsworth et al. | 318/587 |
| 4,459,590 | 7/1984 | Saulnier | 365/192 |
| 4,465,155 | 8/1984 | Collins | 318/587 |
| 4,530,056 | 7/1985 | MacKinnon et al. | 364/424 |
| 4,626,995 | 12/1986 | Lofgren et al. | 364/424 |

Primary Examiner—Gary Chin
Attorney, Agent, or Firm—W. Thad Adams, III

[57] ABSTRACT

A method for providing destination and vehicle function information to an AGV comprises the steps of providing one or more stationary dynamically codeable passage transducers (5) at predetermined spaced-apart points along an AGV path (220). The AGV path (220) is provided with a separate guidance wire (W1, W2, W3) or other guidance system. Each of the transducers (5) has a digital readable instruction set representing instructions to the vehicle. A transducer reader is provided on each AGV (200) for reading the instruction set of each transducer (5) as the AGV (200) proceeds along path 220 past the transducer (5) in reading relation. The instructions read are interfaced with the control system of the AGV (200) to provide a predetermined AGV (200) response. Additional steps in the method permit reprogramming of each transducer (5) by a reader/-writer (129) on each AGV (200) to provide different instructions to a following AGV (200) and also a way of determining priority of movement between two converging AGVs (200).

5 Claims, 6 Drawing Sheets

4,780,817

METHOD AND APPARATUS FOR PROVIDING DESTINATION AND VEHICLE FUNCTION INFORMATION TO AN AUTOMATIC GUIDED VEHICLE

TECHNICAL FIELD AND BACKGROUND OF THE INVENTION

This invention relates to a method and apparatus for providing information, such as destination and vehicle function information to an automatic guided vehicle (AGV). The invention is intended specifically for use with AGV systems of the type which have another primary AGV guidance system. The guidance system may be an electro-inductive system wherein the vehicle senses and following an electromagnetic field generated through a wire in or on a floor which defines the AGV path. Another guidance system suitable for use in combination with the invention according to this application would be an optical guidance system wherein a light detector on the AGV guides the AGV from point to point along a path by detecting and moving towards a space-apart plurality of stationary LEDs. Of course, many other guidance systems can also be used.

The method and apparatus according to the invention may have a number of different levels of application.

For example, one application is in a system in which no off-board vehicle control system is used. Control of the vehicle is limited to telling the vehicle where to go, starting the vehicle along the guidance path and stopping the vehicle when it reaches its destination. Such a system provides a flexible, self-sufficient AGV at a relatively lower cost than prior art systems having much less flexibility.

Another application would include the use of the method and apparatus of this invention in combination with an off-board system controller which communicates with a plurality of vehicles to give the AGVs a greater degree of self control and to add greater flexibility to the design and lay-out of the AGV path. The off-board system controller handles order management, host interfacing, traffic control and similar duties while, according to the invention destination and certain AGV functions are carried out separately.

The basic principle behind the invention is to provide certain information at logically-predetermined spaced-apart points along the vehicle path to an AGV vehicle. The information is delivered to the AGV from a stationary point. Delivery is made by means of a reader mounted on the AGV which passes across the stationary point and, while so doing, receives information which is interfaced with the AGV controls to provide a predetermined response.

Similar functions have been provided with much less flexibility and efficiency by the use of several prior art methods. One such method involves the use an optical reader mounted on an AGV which reads bar codes painted onto or otherwise adhered to the floor along the path followed by the AGV. Such optical sensing devices provide only relatively limited capacity for information transfer and must be replaced when worn or when a change in the information to be transmitted is required. Such systems are particularly sensitive to soiling, wear and misalignment between the bar code strips and the optical reader.

Another system used in the prior art is a series of metal plates arranged in a pattern along the AGV path. A magnetic reader on the AGV senses the magnetic fields generated by the metal plates in a particular series pattern as the AGV moves across the array of metal plates. As with the above-described optical system, the amount of information which can be transmitted by this manner is relatively limited. The arrangement of the magnets must be manually changed whenever a change in the information to be transmitted is required. Of course, this system is particularly sensitive to magnetic interference from other sources.

Another prior art type of system includes the stacking of magnets with the north-south orientation varied to generate an output having a particular cumulative magnetic angular orientation. This orientation is sensed by a reader on the AGV. This system suffers from essentially the same limitations as described above.

The method and apparatus according to this invention makes novel use of components which are already known. One of the components is best described as a passive programmable transducer for dynamic coding. This particular type of transducer and its associated reader/writer is described in detail in U.S. Pat. No. 4,459,590. In its prior art use, the device is attached to articles, such as TV or automobile chassis, which are moving along an assembly line, or to stock items being stored and/or retrieved in a warehouse environment. As items to which the transducer is attached move along a predetermined path, they pass within close proximity of a stationary reader/writer which can receive information from the transducer. There are a number of significant features unique to this type of apparatus. First, the transducer is totally passive. The transducer can receive and store information in digital form without contact or electrical connection and without an electric supply. The reader/writer apparatus can receive the digital information programmed in the transducer by passing over it in close proximity. In another mode, the reader/writer can erase the digital information stored in the transducer and reprogram it with other information. It must be emphasized that these components have heretofore been used by mounting the transducer on *moveable* items such as automobile chassis and passing the transducers past *stationary* reader/writers. By so doing, production mapping, automatic assembly, sorting and process control is carried out by delivering information received by the reader to a central computing system and, when necessary, sending programming instructions to the writer which adds and/or replaces information on the transducer.

The method and apparatus according to this invention involves the adaptation of the components described above to a completely new environment for a different purpose.

SUMMARY OF THE INVENTION

Therefore, it is an object of the invention to provide a method which reliably delivers destination, switching and function information to an AGV.

It is another object of the invention to provide a method for controlling an AGV which includes the ability to deliver different information to successive AGVs on an AGV path.

It is yet another object of the invention to provide an apparatus for carrying out the method according to the invention.

These and other objects and advantages of the invention are found in a method for providing destination and vehicle function information to an AGV which includes providing one or more stationary dynamically codeable passive transducers at predetermined spaced-apart points along an AGV path, the AGV path having separate guidance means to be sensed and thereby followed by the AGV. Each of the transducers is coded with a digital readable instruction set representing instructions, such as destination, switching or function information, to the AGV. A transducer reader is provided on each AGV for reading the instruction set of each transducer as the AGV proceeds along the path past the transducer. The instructions thus read interface with the AGV control means to provide a predetermined AGV response.

In accordance with one embodiment of the invention, the method includes the step of providing a transducer programmer on the AGV, erasing the instruction set in a transducer after being read by the reader and writing a new instruction set into the transducer for being read by a reader on a following AGV.

In accordance with a preferred embodiment of the invention, the transducer contains information by which the AGV destination, switching and various functions can be controlled.

Another embodiment of the invention includes a method by which vehicle priority information is delivered by the transducer for instructing one of two or more AGVs on different branches to stop to allow another AGV having priority to proceed.

The apparatus according to the invention comprises an AGV chassis with motive means and guidance means for guiding along an AGV path by means of interactive path sensing and servo-correction. Code reading means are providing for reading information contained in a stationary dynamic code means positioned at predetermined spaced-apart points along the AGV path. Each dynamic coding means is coded with destination, switching or function information. Interfacing means between the motive means of the AGV and the code reading means provide a predetermined AGV response to the information read by the code reading means.

Preferably, a dynamic code means programmer is provided for erasing the information in the code means after being read by the code reading means and reprogramming the code reading means with information for being read by a following AGV.

BRIEF DESCRIPTION OF THE DRAWINGS

Some of the objects and advantages of the invention have been describe above. Other objects and advantages of the invention will become apparent when taken in connection with following drawings, in which.

DETAILED DESCRIPTION OF THE PREFERRED EMBODIMENT

Figure 1:
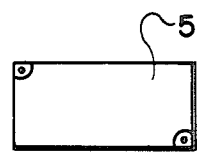
FIG. 1 is a top plan view of a stationary dynamically codeable passive transducer.

Referring now specifically to the drawings, a transducer of the type described in U.S. Pat. No. 4,459,590 and adapted for use in the invention described in this Application is shown and indicated at reference numeral 5. Transducer 5 is enclosed within a metal case to which is bonded a front face. The components of transducer 5 are molded into a hard plastic resin case which is essentially impervious to damage or physical intrusion. The ability to encase the working parts of transducer 5 within such a case make it particularly useful in industrial environments where corrosive gases and/or liquids are present and in areas where abuse is common. Transducer 5 is relatively small (10 cm × 5 cm × 1.5 cm) so that it can be easily placed within a relatively small area.

Figure 2:
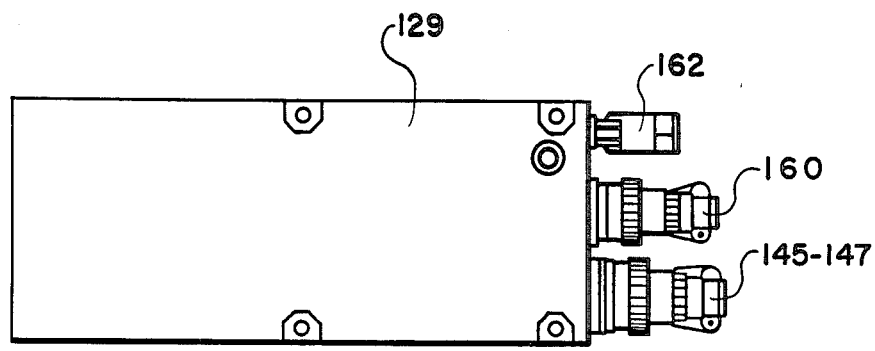
FIG. 2 is a top plan view of a reader/writer.

As reader/writer 129 according to the U.S. Pat. No. 4,459,590 and also adapted for use in this invention is shown in FIG. 2. The electronic circuitry within reader/writer 129 (shown in FIG. 4) is enclosed within a plastic case having three outputs which are described in further detail below. A full and complete description of the components shown in FIGS. 1, 2, 3 and 4 can be found in U.S. Pat. No. 4,459,590 which is incorporated herein by reference. The following description of the major components described in the U.S. Pat. No. 4,459,590 is included for purposes of describing this invention but, as will be appreciated, certain components such as the programming sequencer need not described specifically below.

Figure 3:
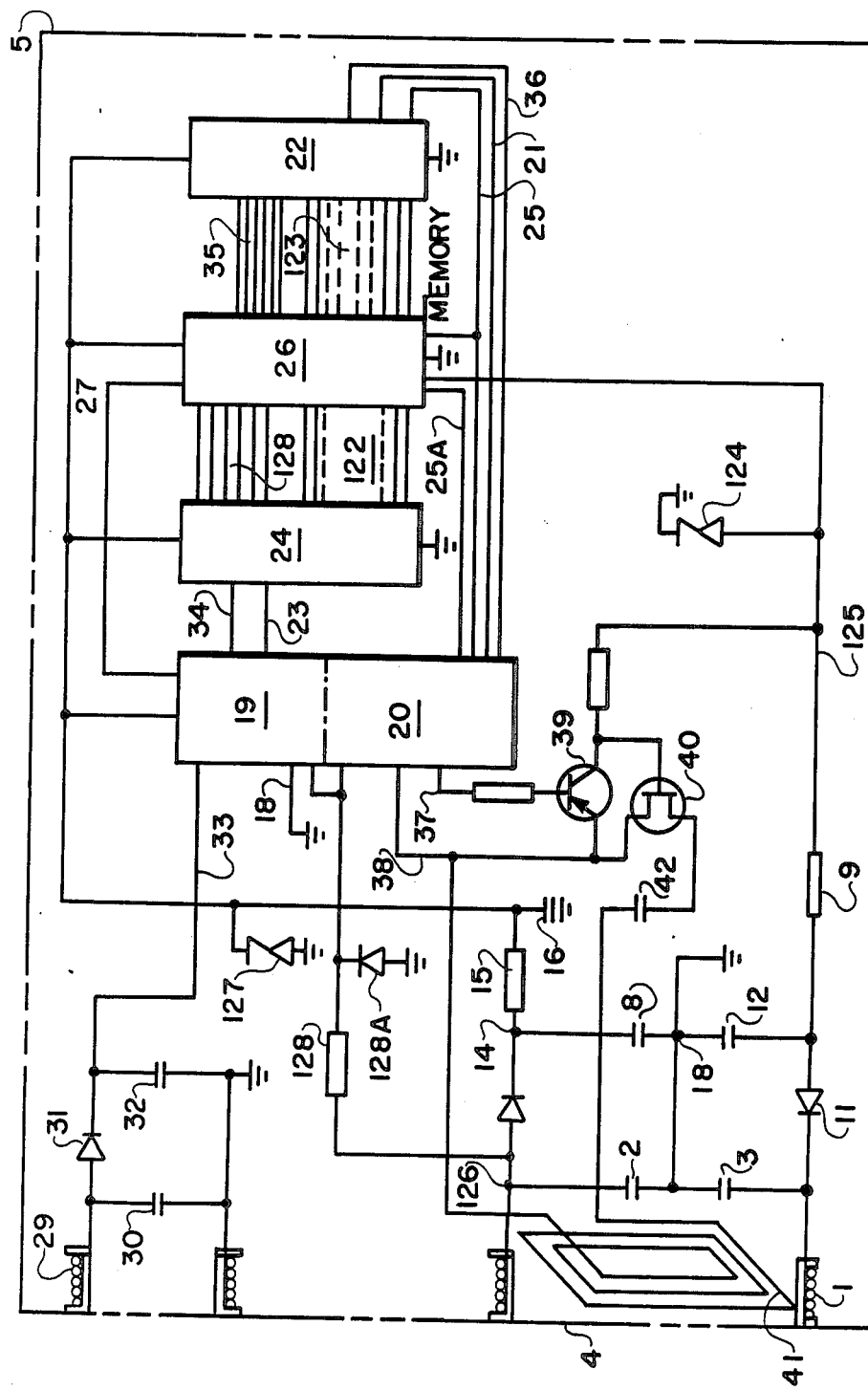
FIG. 3 is a circuit diagram of the transducer shown in FIG. 1.
Figure 4:
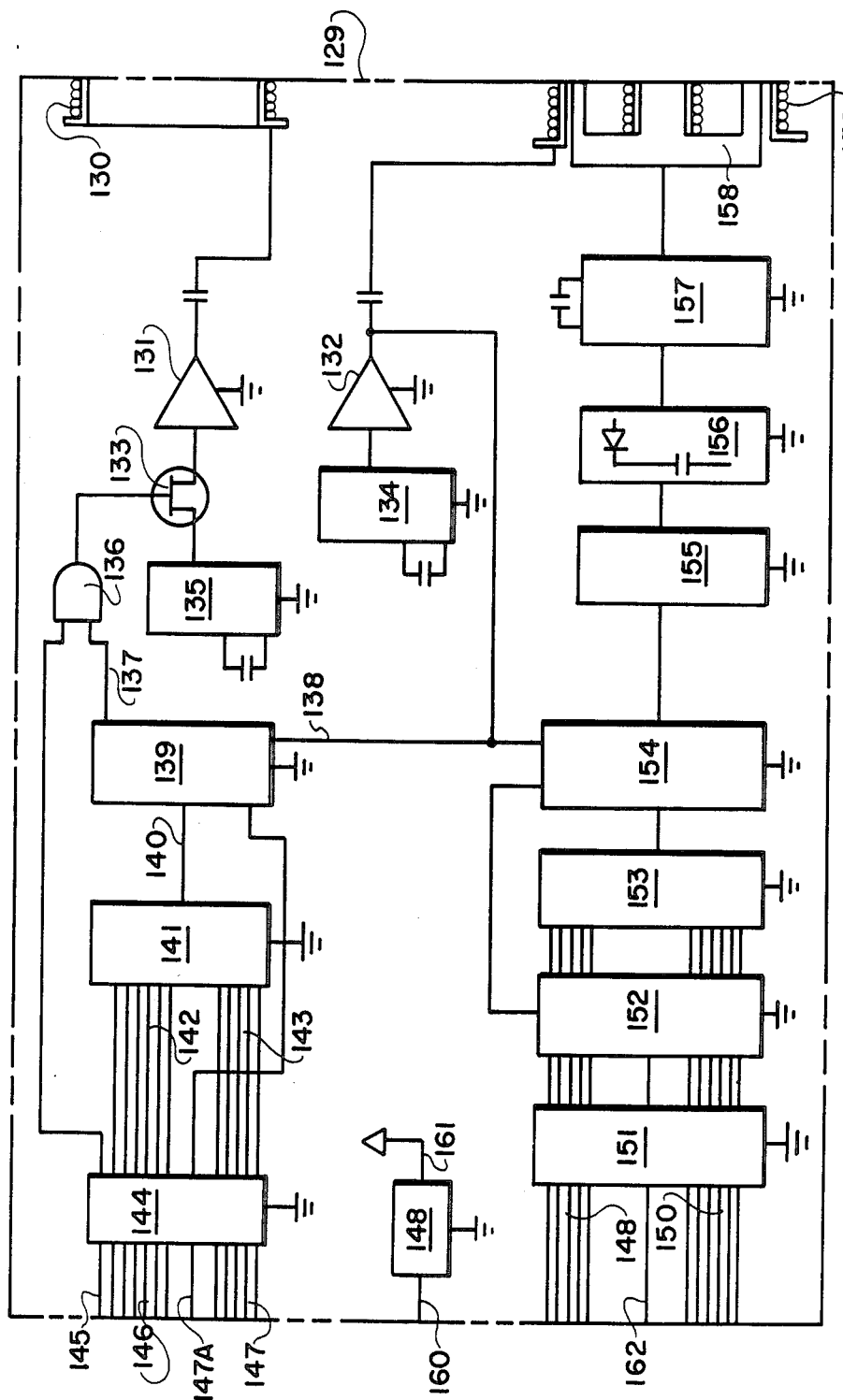
FIG. 4 is a circuit diagram of the reader/writer shown in FIG. 2.

FIG. 3 is a diagram of the transducer. Memory 26 is an electrically alterable read-only memory (EAROM) circuit. A reception coil 1 comprises two windings, each tuned by means of capacitors 2 and 3. This coil 1 is oriented towards the transmission face 4 of the transducer 5. A resistor 6, diode 7 and capacitor 8 network allows a positive voltage to be obtained at point 14. The resistor 15 and the capacitor 16 network enables the positive smoothed general supply voltage to be obtained at point 17. The resistor 9, diodes 10 and 11 and capacitor 12 network delivers a negative voltage at 18 which will be subsequently the voltage bus. The power signal provides the basic clock frequency supplied to modulator 20 and demodulator 19 after clipping by means of diode 11. The demodulator 19 supplies the clock 23 output to the series-parallel converter 24 and modulator 20 supplies the clock 23 output to the parallel-series converter 22. Modulator 20 also supplies the reading signal 25 to EAROM memory 26. The demodulator 19 also supplies the enabling signal 27 which allows writing of the parallel information present on lines 28 of the converter 24. The coil 29 receiving the programming signal is tuned by capacitor 30 to the programming frequency. Diode 31 and capacitor 32 enable the information to be stored to be obtained in series form over line 33.

Demodulator 19 receives on its line 33 the information to be stored, synchronizes itself to the timing information, tests the information and its parity and generates the enabling signals 27. Demodulator 19 creates a succession of "I" and "O" signals at its decoding output 34. This signal is converted by converter 24, which translates the series signal 34 into information in parallel form at its outputs 28. This parallel information is present on the input lines of memory 26.

The enabling signal 27 allows this information to be transferred into the memory cells of memory 26. When the user or the control system wishes to read the data stored in memory 26, the reader/writer transmits to the transducer a power signal which supplies energy to the transducer and feeds thereto a clock signal, and the modulator 20 generates on its line 25 a read-request signal to memory 26 and to converter 22.

As soon as this signal is received on line 25, memory 26 delivers, over its output lines 35, the parallel information contained in this memory 26. This parallel information is present on lines 35 of converter 22 which puts them in series form at the timing of clock 21 and when the read-request signal 25 is active. The series signal transits over line 36 to the modulator 20 includes the timing information, the parity and the width module of the signal 36.

The modulator 20 has two outputs 37 and 38 in phase opposition. Output 37 is connected to the emitter of a NPN transistor 39. The base of transistor 39 is connected, through a resistor, to the output 38. Depending on the polarity of the signals 37 and 38, transistor 39 is either disabled or saturated. The collector of transistor 39 is connected to static switch 40. When transistor 39 is disabled, the static switch 40 is conducting and therefore presents a low passing resistance. When transistor 39 is saturated, the static switch 40 is open. When the static switch 40 is closed, it brings into operation a series resonating circuit formed of a spiral etched on a printed circuit 41 and a tuning capacitor 42. The tuning frequency corresponds to the frequency of the single oscillator 95 of the programming sequencer 74 or 51 of the reader/writer 45.

Energy is then received through coil 1, when a reader/writer 45 is opposite the transducer 5. When the transducer 5 no longer receives this power signal, the information stored in the cells of memory 26 must be maintained, hence the use of an EAROM-type memory 26. Since the outputs 35 of memory 26 are at a high impedance, the holding current is of the order of 10-12 A, which allows a holding time for the information on the order of ten years.

The power signal, tapped at point 126, is clipped by resistor 128 and diode 128A and is fed as clock signal to modulator 20 and demodulator 19. Demodulator 19 supplies on line 23 a clock signal to the series-parallel converter 24 and modulator 20 supplies a clock signal over line 21 to the parallel-series converter 22.

Coil 29 for receiving the programming frequency forms with capacitor 30 a resonating circuit tuned to the programming frequency. Diode 31 and capacitor 32 enable the information to be stored to be obtained by detection, which information is fed over line 33 to demodulator 19. Demodulator 19 synchronizes itself to the timing information (see FIG. 1, line A), tests the parity and generates an enabling signal over line 27. The output signals of the demodulator are fed by line 34 to converter 24. Converter 24 translates the information in parallel form and feeds it to memory 26. The data contained in the information is sent over lines 28 to memory 26 at addresses communicated by the addressing lines 122. If, for example, each piece of information is expressed in sixteen bits, the eight least significant bits relate to the datum and the eight most significant bits relate to the address of this datum.

When the user or the control system wishes to read the data stored in memory 26, a read-request signal is fed through the reader/writer. The address is transmitted by demodulator 19 and converter 24 to memory 26, whereas the read-request signal is fed by the demodulator 19 to modulator 20 which emits over line 25 a read-request signal and over line 25A a read-selection signal which places the outputs of memory 26 at a low impedance. The data read from memory 26 at the address indicated are fed over lines 123 and their addresses over lines 35 to converter 22 which puts them in series and transfers them over line 36 to modulator 20 at the timing of the clock signal fed over line 21 by modulator 20. Modulator 20 includes in this information, timing information, a parity bit and modulates them. The output signal of modulator 20 appears at both its outputs 37 and 38 which are in phase opposition. Output 38 is connected to the emitter of a PNP transistor 39 whose base is connected through a resistor to output 37. Depending on the polarity of the signals at the outputs 37 and 38, transistor 39 is saturated or disabled. When transistor 39 is disabled, the static switch 40 is conducting and so closed, and when 39 is saturated switch 40 is open.

When switch 40 is closed, it brings into operation a series resonating circuit formed from a spiral etched on a printed circuit 41 and a tuning capacitor 42.

The transducer 5 permanently receives through its coil 1 the power signal which allows it to be supplied with power when a reader/writer 129 is opposite this transducer 5. When the transducer 5 no longer receives this power signal it is no longer supplied with energy but the information contained in the cells of memory 26 remains.

The reader/writer 129 comprises a voltage regulator device 148 which is connected by a line 160 to a supply circuit (not shown). The output 161 of regulator 148 supplies the supply voltage to all the circuits of the reader/writer 129.

The writer part of reader/writer 129 comprises an input adapter (shaping circuit) 144. The inputs 146 receive the data to be stored, inputs 147 receive the address at which these data are to be stored, input 145 receives a programming enabling signal and input 147A receives a read-request signal.

Outputs 142 and 143 of adapter 144, corresponding respectively to its inputs 146 and 147, are connected to a parallel-series converter 141 whose output is connected to a modulator 139 identical to those described above. The output of adapter 144, corresponding the input 147A, is connected to a modulator 139. The output of modulator 139 is connected to a first input of an AND gate 136 whose other input is connected to an output of adapter 144 corresponding to input 145. The output of gate 136 is connected to the control electrode of a circuit switch 133 which connects a programming oscillator 135, permanently oscillating to a power amplifier 131 whose output is connected to a programming coil 130 which emits at the timing of the output signal of the modulator, when gate 136 is enabled by the input signal 145, an electromagnetic field at the programming frequency, in front of the transmission face of the reader/writer 129.

The reading part of the reader/writer 129 comprises a power coil 159 supplied with power by an oscillator 134 and a power amplifier 132, and a signal coil 158 connected to a signal oscillator 157. Oscillator 157 is connected to a detection cell 156 whose output is connected through a shaping circuit 155, advantageously a Schmitt trigger, to a demodulator 154. The output of demodulator 154 is connected by a series-parallel converter 153 and by a register 152 to an output interface 151. Interface 151 also includes an input 162 for enabling its output 149.

The output of amplifier 132 is also connected to the clock signal inputs of modulator 139 and demodulator 154, and that the frequency of the signal of oscillator 134 is the same as that of the clock signal of modulator 20 and demodulator 19 of the transducer 5. The emission of the data to be programmed (inputs 146) at the desired addresses (inputs 147) may take place simultaneously with the reception of the programmed data (outputs 150 of interface 151) at the corresponding addresses (outputs 149), this under the control of the control system, because the modulator and the demodulator of the transducer 5 and of the reader/writer 129 act independently of each other.

Figure 5:
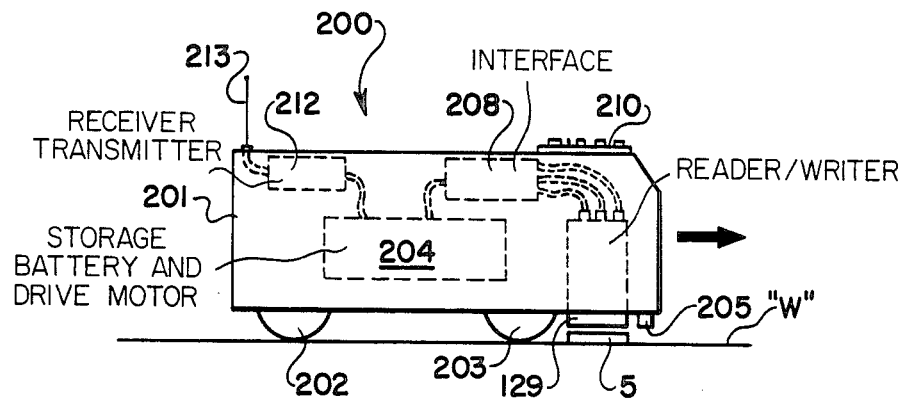
FIG. 5 is a hypothetical automatic guided vehicle (AGV) according to the present invention.

Referring now to FIG. 5, an AGV vehicle 200 for use in accordance with the present invention is shown. AGV 200 comprises a chassis 201 driven by two spaced-apart pairs of wheels 202 and 203, respectively. AGV 200 is powered by rechargeable storage batteries which energize electric drive motors (collectively shown schematically at 204) to rotate the wheels in a predetermined direction of rotation and speed. AGV 200 is steered by any suitable means of automatic guidance. As described above, the vehicle may be steered by sensing and following a wire applied to or imbedded within the surface on which AGV 200 moves. Alternately, an optical system may be used wherein a light source is sensed and followed. For purposes of illustrating the invention, it will be assumed that AGV 200, through suitable sensors and circuitry (not shown) guides along a wire embedded in a floor by means of a sensing unit 205. With continued reference to FIG. 5, a transducer 5 of the type described above is applied to the floor surface in a predetermined proximity to the wire. The reader/writer 129 is positioned on AGV 200 in such a manner that when AGV 200 passes over transducer 5, reader/writer 129 induces transducer 5 to transmit to it an instruction set. The information contained within the instruction set may be information concerning the destination of the AGV, information concerning which of two or more paths to follow at a branch, or function information such as a speed increase or reduction, flashing lights, warning bells or any other desired vehicle function.

In one embodiment of the invention, memory 26 of transducer 5 contains 512 bits (64 words of 8 bits each). Information received from transducer 5 by reader/writer 129 is delivered to an interface 208 on board AGV 200 which outputs the appropriate vehicle control or function signal.

Figure 6:
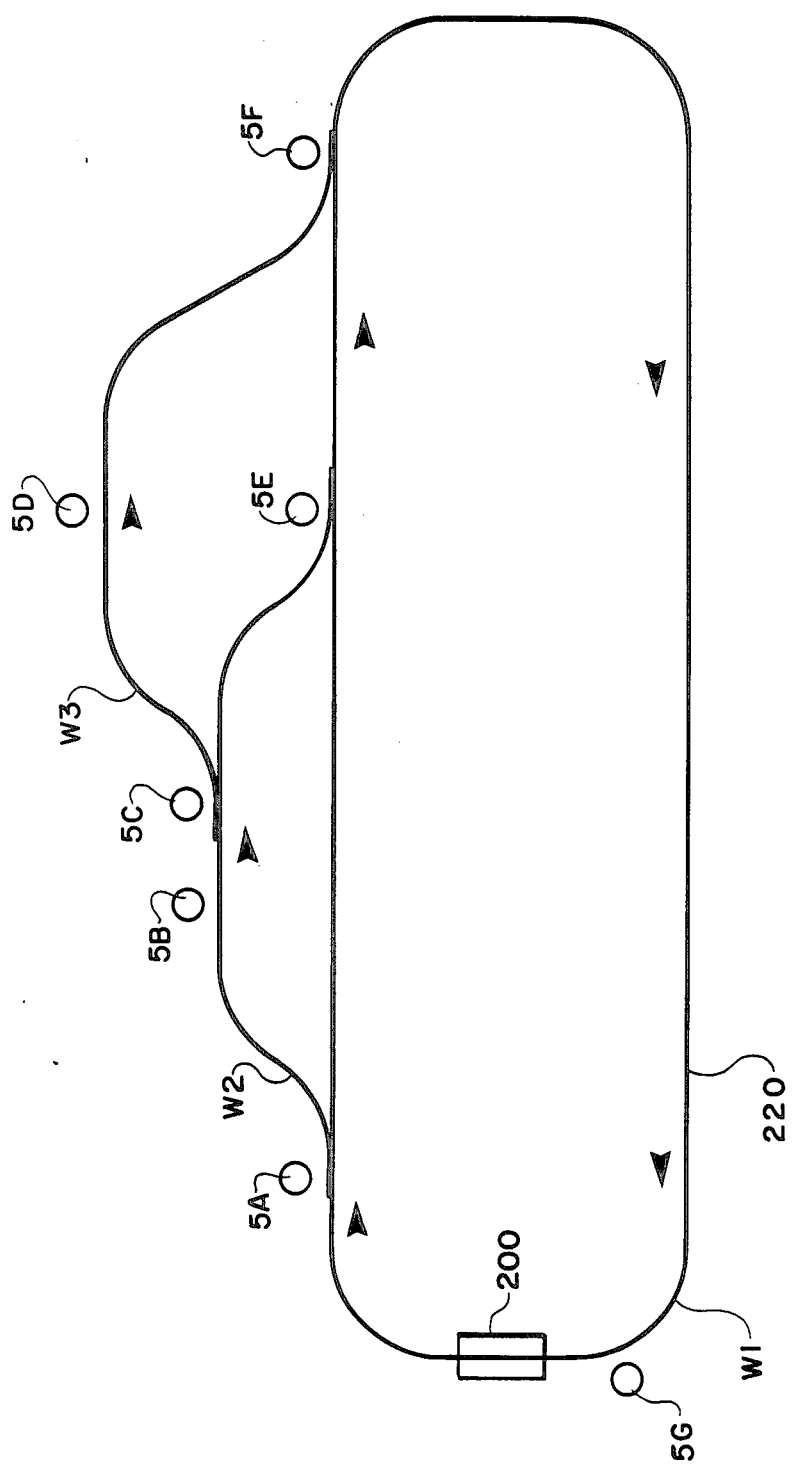
FIG. 6 is a top plan view of a hypothetical path along which an AGV according to the present invention moves as it receives information from transducers spaced along the path.

The system will be further explained with reference to FIG. 6. A hypothetical path 220 is defined by a primary guide wire W1 and secondary and tertiary guide wires W2 and W3, respectively. For purposes of discussion, primary guide wire W1 emits a frequency of 2200 Hz. Secondary guide wire W2 transmits a frequency of 3100 Hz and tertiary guide wire W3 emits a frequency of 400 Hz. On the path 220 just described seven transducers 5 have been placed. These will be referred to as tranducers 5A, 5B, 5C, 5D, 5E, 5F and 5G.

AGV 200 is placed in a start position as shown in FIG. 5. In accordance with one preferred embodiment, vehicle 200 may be programmed manually by means of a control panel 210 which includes three thumb wheels permitting a setting of any number between 000 and 999. The number thus set identifies to AGV 200 a destination. After the operator has manually set the destination into the AGV 200 by means of the control panel 210, a start switch also on the control panel is pressed. AGV 200 then begins to move forward guiding along wire W1. When reader/writer 129 passes over transducer 5A, it will receive one of two switching instruction sets. Since transducer 5A is at a branch, one instruction set will instruct vehicle 200 to continue along primary wire W1, i.e. to continue sensing the main frequency of 2200 Hz. The other instruction set would instruct AGV 200 to cease sensing on 2200 Hz and switch to 3100 Hz, thereby diverting it onto secondary guide wire W2. When AGV 200 reaches transducer 5B, it may be instructed to stop, in which case transducer 5B serves as a destination point. At this point cargo may be off-loaded from or loaded onto AGV 200 and then manually restarted. Alternatively, transducer 5B could serve to identify a function point where AGV 200 is instructed to slow down, activate its warning lights, activate or deactivate a door opener, a collision avoidance system or any other desired AGV function. When AGV 200 reaches transducer 5C, (a destination point) it may be instructed to continue sensing 3100 Hz, in which case it proceeds along secondardy guide wire W2 to transducer 5E. Transducer 5E defines a switching point, at which point AGV 200 is instructed to begin sensing 2200 Hz, the frequency of the primary guide wire W1. If AGV 200 is on the branch defined by tertiary guide wire W3, it receives a function command at transducer 5D, then transducer 5F instructs AGV 200 to begin again sensing the primary wire frequency of 2200 Hz. AGV 200 proceeds until it reaches transducer 5G, another destination point where AGV 200 is instructed to stop and wait for further operations.

Alternatively to the manual system described above, each AGV 200 may be controlled remotely from a central processor (not shown) by means of, for example, radio infrared or inductive communication, in accordance with several well known methods. In this case, a onboard receiver/transmitter 212 receives and sends instructions to the central processor via an antenna 213. When the vehicle is remotely controlled, the transducers 5 identify to the central processor th AGV 200's present location, significantly reducing the number of communication points required between AGV 200 and the stationary controls. Programming the computers which control the central processor is greatly simplified. Less time is required to implement the system and, once implemented, changes can be made merely by adding, removing or reprogramming one or more of the transducers 5.

Figure 7:
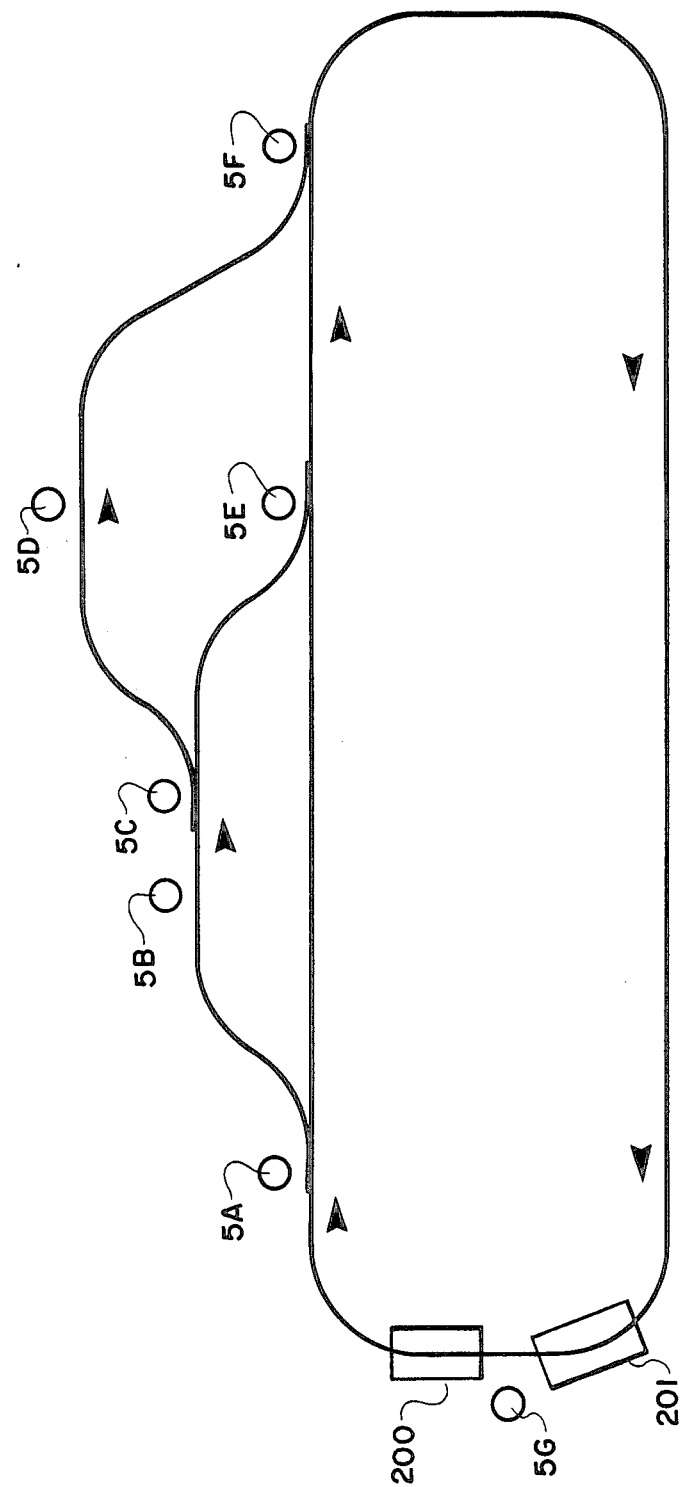
FIG. 7 is a top plan view of an AGV path as shown in FIG. 6 as used in accordance with one embodiment of the invention.

The reprogramming function is illustrated in FIG. 7. The same primary, secondary and tertiary guide wires W1, W2, W3 define path 220. However, in this example, an AGV 200 and an AGV 201 are simultaneously present on path 220. AGV 200 is required to travel to the destination indicated at transducer 5F via primary wire W1, secondary wire W2 and tertiary W3. Upon reaching its destination it stops. It returns to transducer 5G upon being manually restarted by an operator. AGV 201 is required to proceed to its destination, transducer 5E via secondary wire W2, stopping momentarily at transducer 5B to permit cargo to be off-loaded.

AGV 200 travels along wire W1 until it reaches transducer 5A. Reader/writer 129 reads the instruction set from transducer 5A which commands the vehicle to switch a sensing frequency of 3100 Hz (W2). At this point, however, the writer of reader/writer 129 erases the instruction set stored in transducer 5A. Because AGV 201 will follow the same path it reprograms the same instruction set. Therefore, when AGV 201 reaches transducer 5A it, likewise, will be commanded to begin sensing on the secondary wire W2 at a frequency of 3100 Hz.

AGV 200 is commanded to stop momentarily while cargo is off-loaded, then it restarts and travels past transducer 5C. Transducer 5C instructs AGV 200 to begin sensing on 400 Hz (W3). However, since AGV 201 will remain on the secondary wire W2, the writer of reader/writer 129 erases the instruction set containing that instruction and reprograms transducer 5C with an instruction set which, when sensed by reader/writer 129 on AGV 201 will instruct it to continue sensing at 3100 Hz (W2).

AGV 200 receives a function command, for example to open a door, at transducer 5D and then proceeds to transducer 5F where the instruction set received by reader/writer 129 commands AGV 200 to begin sensing at the primary wire W1 frequency of 2200 Hz. Since AGV 201 is already sensing at 2200 Hz, it passes over transducer 5F without any change in function. As is apparent, AGV 201 can also reprogram each transducer at it passes. In this way, AGV 200 and AGV 201 can alternate a repetitive routine or predetermined variation where each trip around the path is somewhat different depending on requirements.

The system described above is applicable to a path having any particular number of AGVs. The reprogramming function described above makes it unnecessary to provide individual transducer for each AGV, substantially reducing the cost and complexity of the system.

Figure 8:
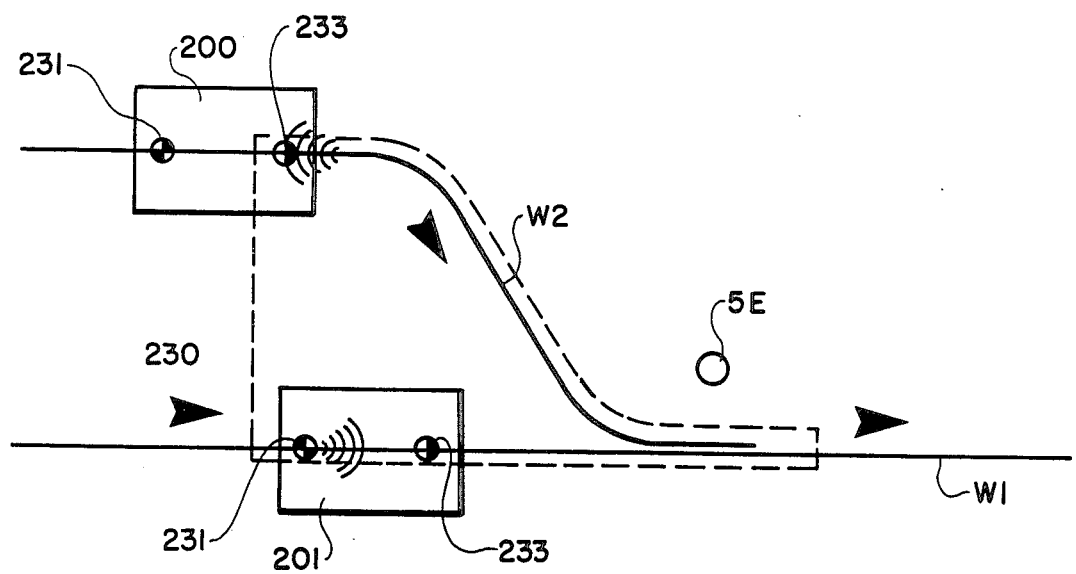
FIG. 8 is a fragmentary top plan view of a AGV path branch showing priority control for two converging AGVs.

Another variation on the system described above is illustrated in FIG. 8. To avoid the possibility of a collision between AGV 200 and AGV 201, an induction communication loop 230 is placed in the path upstream of transducer 5E. Each vehicle is equipped with a radio transmitter 231. Receivers 233 on each vehicle are tuned to receive the signal transmitted by transmitters 231. Assuming AGV 201 reaches loop 230 first, the signal transmitted by transmitter 231 is received and transmitted by loop 230. This signal is picked up by receiver 233 on AGV 200, which is programmed through vehicle interface 208 to either stop or reduce its speed sufficiently to permit AGV 201 to pass ahead of it. When the signal being transmitted by transmitter 231 is no longer being picked up and relayed by loop 230, AGV 200 continues towards transducer 5E, where it switches to a sensing frequency at 3100 Hz, as described in detail above. In the transducers 5 described above, memory 26 has 256 (0-255) addressable locations. The numbers 0 and 255 are reserved, giving a total of 254 possible destinations in the system. Of course, this is far in access of what will ordinarily be needed. The remaining addressable locations in memory 26 are therefore used for switching instructions and function instructions.

At a minimum, only six of the bytes in each transducer need be used. These can be referred by the labels given below:

| Address | Label |
| --- | --- |
| 0 | LOC |
| 1 | MIN−1 |
| 2 | MAX+1 |
| 3 | FMAIN |
| 4 | FBRANCH |
| 5 | FUNC |

Each of the three types of instruction sets in transducer 5 can be programmed using these six bytes.

For programming switch points, i.e. where a vehicle is instructed to change the frequency on which it senses in order to follow a branch path, a single transducer 5 can serve to merge any number of incoming tracks into one or more outgoing tracks. A switch point is identified with a value of $\phi$ in the LOC byte. The transducer 5 defines what destinations can be reached by taking the path defined by the primary wire W1 and the frequencies defined for the primary wire W1 and the secondary or tertiary wires W2 and W3. The destinations served by the secondary and tertiary wires W2 and W3 are specified by the lowest destination minus 1 (MIN−1) and the highest destination plus 1 (MAX+1). The vehicle interface 208 on board AGV 200 compares the destination specified to it by transducer 5 with the destinations served by the secondary and tertiary wires W2 and W3. If the desired destination lies within the bounds specified for the secondary or tertiary wires W2 and W3, the vehicle interface reads the branch frequency (FBRANCH) from transducer 5 and outputs it to the vehicle interface. If the specified destination does not lie within the bounds specified for the branch, the interface reads the main frequency (FMAIN) from the transducer 5 and outputs it to instruct the vehicle accordingly.

The FUNC byte is not used in the switching mode.

The destination point is described by a value between 1 and 254, inclusive, in the LOC byte. This value represents the destination number and is unique. There would never be two destination points with the same number in a single system. When AGV 200 crosses a transducer 5 containing destination instructions, the vehicle controller compares the destination set manually by the operator on control panel 210 with the destination number specified by the transducer 5. If they are equal, the vehicle interface sends a stop signal to vehicle controller 204, then waits for a new destination to be entered manually in control panel 210. Then, AGV 200 proceeds along the path to find its next destination.

If the destination sensed by reader/writer 129 does not equal the destination number programmed into AGV 200, the vehicle interface will send the primary wire W1 frequency to the vehicle controller 204 allowing it to continue on its way.

To facilitate the correct flow of AGVs 200 through destination points they are not addressed to, the following values are programmed into each transducer 5:

MIN−1 = Destination Number −1
MAX+1 = Destination Number +1
FMAIN = The Frequency the Vehicle Follows to Get to That Particular Point The FUNC byte is not used when the transducer 5 is programmed as a destination indicator.

When transducer 5 is programmed to indicate a function instruction to AGV 200, the transducer 5 is always identified by a value of 255 in the LOC byte. When AGV 200 encounters a transducer 5 programmed to instruct a function, vehicle interface 208 reads the FUNC byte from the transducer 5 and transmits it to vehicle controller 204. It is then up to the vehicle controller 204 or other external hardware to handle each of the eight function bits as desired for the particular desired by the user.

A method and apparatus for providing destination and vehicle function information to an automatic guided vehicle is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. An automatic guided vehicle (AGV) comprising:
   (a) an AGV chassis with motive means thereon;
   (b) guidance means for guiding said AGV along an AGV path;
   (c) code reading means for reading information contained in a stationary dynamic code means positioned at predetermined spaced-apart points along the AGV path, each dynamic code means coded with distination, switching or vehicle function information;
   (d) interfacing means between the motive means of said AGV and said code reading means for providing a predetermined AGV response in accordance with the information read by the code reading means;
   (e) a dynamic code means programmer for erasing the information in the code means after being read by the code reading means and reprogramming said code reading means with information for being read by a following AGV.

2. A method for providing destination and vehicle function information to an automatic guided vehicle (AGV) comprising the steps of:
   (a) providing one or more stationary dynamic code means at predetermined space-apart points along an AGV path, said AGV path having separate guidance means to be sensed and thereby followed by the AGV, each of the code means coded with destination, switching or vehicle function information;
   (b) providing a code means reader on each AGV for reading the information of each code means as the AGV proceeds along the path past the code means;
   (c) interfacing the information read by the code means with AGV control means to provide a predetermined AGV response;
   (d) providing a code means programmer on each AGV;
   (e) the programmer erasing the information in the code means after being read by the reader; and
   (f) the programmer coding new information into the code means for being read by a following AGV.

3. A method according to claim 2 wherein the information contains stop/start and vehicle speed data.

4. A method according to claim 2 wherein the switching information is for instructing an AGV to guide on one of two or more path branches.

5. A method according to claim 2 wherein the information contains vehicle priority data for instructing one of two or more AGVs on different path branches to stop to allow the other AGV having a predetermined priority to proceed.

* * * * *